United States Patent [19]

Becker

[11] Patent Number: 4,702,750
[45] Date of Patent: Oct. 27, 1987

[54] PROCESS FOR SEPARATING UNDESIRABLE COMPONENTS FROM GASEOUS MIXTURES

[75] Inventor: Hans Becker, Munich, Fed. Rep. of Germany

[73] Assignee: Linde Aktiengesellschaft, Wiesbaden, Fed. Rep. of Germany

[21] Appl. No.: 830,294

[22] Filed: Feb. 18, 1986

[30] Foreign Application Priority Data

Feb. 18, 1985 [DE] Fed. Rep. of Germany ....... 3505590

[51] Int. Cl.$^4$ .............................................. B01D 47/00
[52] U.S. Cl. .......................................... 55/48; 55/73
[58] Field of Search ...................... 55/46–49, 55/50, 68, 73; 203/73, 74, 75, 78, 80, 42

[56] References Cited

U.S. PATENT DOCUMENTS

| | | | |
|---|---|---|---|
| 3,738,086 | 6/1973 | Belliso et al. | 55/48 |
| 3,954,425 | 5/1976 | Gunther | 55/48 |
| 4,110,087 | 8/1978 | Nolley | 55/73 |
| 4,552,572 | 11/1985 | Galstaun | 55/48 |
| 4,589,889 | 5/1986 | Spencer | 55/48 |

OTHER PUBLICATIONS

Becker, H., et al, "The Linde Solinox ® Process for Flue-Gas Purification", *Reports on Science and Techn.*, 40/1985.

*Primary Examiner*—Bernard Nozick
*Attorney, Agent, or Firm*—Millen & White

[57] ABSTRACT

A process is disclosed for the separation of undesirable e.g., $SO_2$, from gaseous mixtures. Separation takes place by scrubbing in a first scrubbing column with a physical absorbing agent, which after absorbing the undesirable components is regenerated in a regenerating column and recycled to the first scrubbing column. During regeneration, a stream containing the undesirable components, as well as an inert gas components is obtained. The undesirable gas components and the inert gas components are separated in a further process e.g., a distillation stage. During this stage the undesirable components are removed as product and the inert gases, still containing a substantial fraction of undesirable components, are returned to the scrubbing stage. In order to economically recycle only a small amount of undesirable components back to the scrubbing column, during the recycling of inert gas the inert gases are at least partially separated in a second scrubbing column from the undesirable components by contacting with small stream of a physical absorbing agent. The inert gases are then passed to the first scrubbing column.

15 Claims, 1 Drawing Figure

– 4,702,750 –

PROCESS FOR SEPARATING UNDESIRABLE COMPONENTS FROM GASEOUS MIXTURES

BACKGROUND OF THE INVENTION

The invention relates to a process for the separation of undesirable components, ("undesirable" hereinafter understood to refer to components that have to be removed like acid gas and other unwanted elements such as $SO_2$ and other sulfur containing gases but also to components that will be recovered) from gaseous mixtures by scrubbing, in a first scrubbing column, with a physical absorbing agent i.e., absorbent, which agent, after absorbing the undesirable components, is then regenerated in a regenerating column and is reused in the first scrubbing column. The undesirable components released from the agent during regeneration contain small amounts of inert gas components which are then separated in a further high purity cleaning step in which the undesirable components are removed and the inert gases, still containing excess amounts of undesirable components, while being recycled to the scrubbing stage are further treated for removal of the undesirable components. Also, the invention further relates to apparatus for performing the process.

During the separation of an undesirable component, e.g. $SO_2$, from a gas mixture, especially, a flue gas, additional inert gas components, e.g. $CO_2$, and traces of $N_2$ and $O_2$ are also partially scrubbed from the gas. The $SO_2$ separated from the flue gas must be liquefied in many instances so as to facilitate transportation, for example, to further processing facilities, such as sulfuric acid factories. This can be done only after a further separation of the residual gas released from the absorbing agent in a regenerating column, this residual gas primarily comprising $SO_2$ and concomitantly scrubbed-out inert gas, particularly $CO_2$ and the like. This additional separation or high-purity cleaning can be performed, for example, by distillation or adsorption, thereby making it possible both to withdraw pure $SO_2$ while also to obtain an inert gas stream which still contains $SO_2$.

In a distillative separation of the inert gases and of $SO_2$ at almost atmospheric pressure wherein the head temperature of the distillation column is maintained so that it is not too low, e.g., not below $-20°$ C., it is essential to still leave a certain amount of $SO_2$, for example 50% in the recycled inert gas stream. To reduce the recycled inerts from the distillation column, the loaded absorbent may be heated to release inerts which can then be separated from the loaded absorbent agent in a separator before the agent is conveyed to the regeneration column to thereby directly recycle the maximum amount of inert gases. Such a system is disclosed e.g. in "Linde Reports on Science and Technology", No. 40/1985 p. 3-13.

However, when treating e.g. power plant flue gases the amount of $SO_2$ recycled together with the total inert gas recycle stream can be as much as 50% of the $SO_2$ contained in the flue gas. On the other hand the costs for such a separator are very high, and its effectiveness, moreover, is low since only about one-third of the concomitantly scrubbed-out inert gases can be separated.

OBJECTS ON THE INVENTION

Accordingly, an object of the present invention is to provide an economic method of improving the aforementioned process wherein a lesser amount of the undesirable components are returned to the scrubbing column by the inert gas recycle.

SUMMARY OF THE INVENTION

This and other objects have been attained, according to this invention in a process aspect, by (a) separation of the undesirable components from gaseous mixtures by scrubbing in a first scrubbing column with a physical absorbing agent; (b) regeneration of the absorbing agent in a regenerating column, wherein the undesirable components and inert gas components are released from the agent during and the regenerated agent is recycled to the first scrubbing column; and regeneration (c) separation of the undesirable gas components and the inert gas components in a high purity separation unit, wherein the undesirable components are removed, and the inert gases, still containing undesirable components, are recycled into the scrubbing stage; wherein the improvement comprises that the inert gases are at least partially freed of the undesirable components in a second scrubbing column by contacting with a physical absorbing agent and are then returned to the first scrubbing column. This invention further comprises, in an apparatus aspect for conducting the aforementioned process, a system having a first scrubbing column, a regenerating column connected with the sump of the first scrubbing column, a high-purity cleaning unit connected to the head of the regenerating column, the improvement comprising that the high-purity cleaning unit is connected to a second scrubbing column.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
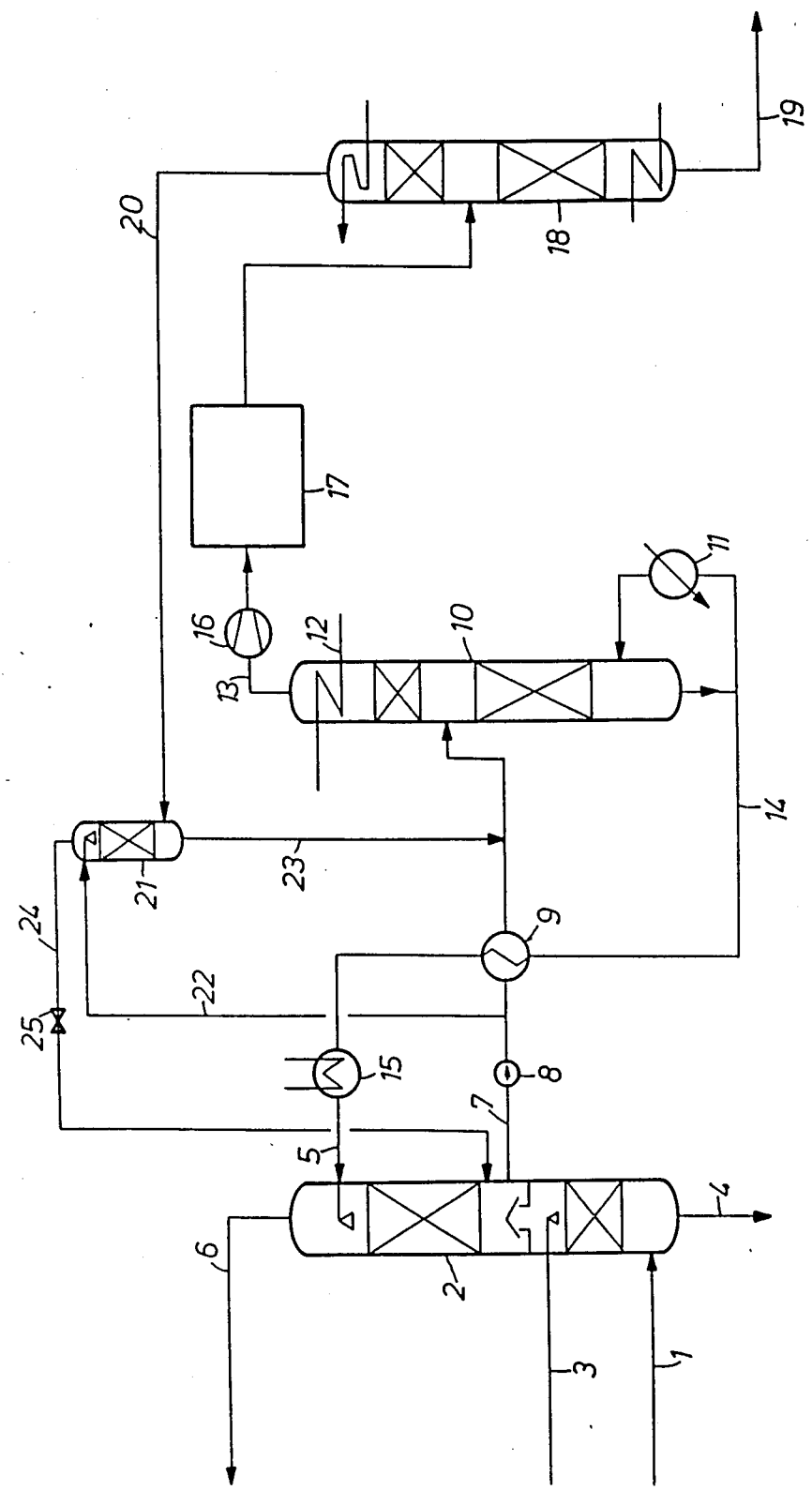
FIG. 1 is a simplified schematic outline of the preferred embodiment of the process.

By following the process of the invention, the quantity of inert gases passed into the regenerating column is not kept at minimum levels such as would be the case if, e.g., they were removed from the heated loaded agent in a separator upstream of the regenerating column; instead, the still remaining undesirable components, are at least partially e.g., about 50 to 99%, separated by absorption from the recycled stream of inert gas. The advantage of this approach primarily resides in that the very expensive, large separator is replaced by a substantially less expensive, small scrubbing column.

In an especially preferred embodiment, a partial stream e.g., about 0.1% to 10%, preferably 1 to 3%, of the absorbing agent leaving the first scrubbing column, loaded with the undesirable components, separates from and passes into the second scrubbing column where it is used for the further removal of the remaining undesirable components. As is known, in physical absorbing agents, e.g., such as methanol, polyethylenglycolethers, N-methyl-pyrrolidone (NMP), dimethylformamide (DMF) or many other substances, the gas absorption capacity is particularly dependent on the partial pressure of the component to be absorbed. In the case of $SO_2$, for example, the partial pressure of $SO_2$ in the first scrubbing column is substantially lower (e.g. for flue gas applications, only some millibar than in comparison to the second column where it can be in the order of one bar), so that the $SO_2$-loaded absorbent which leaves the first scrubbing column can still pick up in the second scrubbing column most of the $SO_2$ from the inert gas recycle. Through this embodiment a reduction in the total amount of scrubbing medium circulating in the process cycle is achieved, and significant reductions can be obtained in both operating and investment costs.

In another preferred embodiment of the invention the loaded absorbing agent from the second scrubbing column is regenerated along with the loaded absorbent from the first scrubbing column. This step eliminates the requirement for an additional regenerating column, a substantial economic benefit.

The invention further relates to an apparatus for performing the process, having a first scrubbing column, a regenerating column connected to the sump of the scrubbing column, as well as to a high purity cleaning unit e.g., a distillation or adsorber connected to the head of the regenerating column. This apparatus is characterized in that the high purity cleaning unit is connected with a second scrubbing column. In a preferred embodiment, the sump of the first scrubbing column is connected to the upper zone of the second scrubbing column. Also, the sump of the second scrubbing column is preferably connected with the regenerating column.

Both the process and the accompanying apparatus of this invention can be utilized in substantially all gas scrubbing operations involving an inert gas recycle, and especially in cases where the component scrubbed out of the gas is to be further processed in the substantially pure form, e.g., as a liquid in which the presence of an inert gas component would have a particularly adverse effect. The process is particularly suitable for flue gas scrubbing operations which have a relatively low $SO_2$ content e.g., about 0.01 to 10 mol% in the flue gas, such as from coal-burning power plants and the like.

EXAMPLE

Turning to FIG. 1, by way of conduit 1, 500,000 $Nm^3/h$ of a flue gas from a power plant, having a temperature of about 50° C. and a pressure of 1 bar, is introduced into the lower portion of scrubbing column 2. The crude gas contains about 3,500 $mg/Nm^3$ of $SO_2$, 1,500 $mg/Nm^3$ of $NO_x$, 300 $mg/Nm^3$ of HCl, 40 $mg/Nm^3$ of HF, and about 150 $mg/Nm^3$ of dust.

The crude gas is cooled in the lower section of column 2 with cooling water (about 1,000 $m^3/h$, at 4°) fed via conduit 3, and is prewashed. By way of conduit 4 the water, now containing dust, in some cases $SO_3$, HF and/or HCl, is removed.

In the scrubbing section of column 2, the rising gas is then mostly separated from its $SO_2$ by countercurrent contacting with 450 $m^3/h$ of tetraethylene glycol dimethyl ether absorbing agent introduced by way of conduit 5, and is discharged from the scrubbing column 2 overhead via conduit 6 at approximately 5° C. and 1 bar, with an $SO_2$ content of about 340 $mg/Nm^3$.

The absorbing agent, loaded with about 600 $m^3/h$ of $SO_2$, as well as 300 $m^3/h$ of $CO_2$, is withdrawn from column 2 via conduit 7 at a temperature of about 9° C. and brought, by means of a pump 8, to about 3 bar. Then, after being heated in heat exchanger 9 against a stream of hot regenerated absorbent, the main stream, i.e., 99% of the loaded absorbing agent at a temperature of about 95° C. is passed into the middle of a regenerating column 10. The regenerating column 10 is equipped with a sump heater 11 and a head cooler 12 and operates at a pressure of approximately 0.5 bar. In the regenerating column the $SO_2$, as well as the concomitantly scrubbed out $CO_2$, are stripped out of the absorbing agent and leave the head of column 10 via conduit 13. The regenerated absorbing agent is removed from the sump of column 10 via conduit 14 at a temperature of about 100° C., then cooled in heat exchanger 9 to 15° C. and further cooled against cooling medium in unit 15, to 4° C., before being reintroduced into scrubbing column 2 via conduit 5.

After a compression and recooling step stage in compressor 16, about 1,270 $Nm^3/h$ of residual gas is obtained, having a temperature 30°, a pressure of about 1.5 bar, and the following composition:

71%: $SO_2$
24%: $CO_2$
2%: $N_2$
3%: $H_2O$

This residual gas is dried in dryer 17 and subsequently fed at virtually unchanged temperature and pressure to a distillation column 18. Distillation column 18 is equipped with heat exchanger means in both the sump and the head. In the sump of distillation column 18, about 580 $Nm^3/h$ of liquid $SO_2$ is removed via conduit 19 as the product, having a temperature of −3° C. and, from the head via conduit 20, 650 $Nm^3/h$ of inert gases are withdrawn, consisting of 49% $SO_2$, 47% $CO_2$, and 4% $N_2$ at a temperature of −20° C.

Since the inert gases still comprises about 50% $SO_2$, they are then introduced into the bottom of a second scrubbing column 21 and scrubbed in countercurrent fashion by a small stream of absorbing agent (5 $m^3/h$), fed via conduit 22, under a temperature of 9° C. and pressure of 1.2 bar.

The absorbing agent from conduit 22 has been partially loaded with $SO_2$ from the first scrubbing column, but can still absorb 290 $Nm^3/h$ of $SO_2$ from the inert gas stream. The loaded absorbing agent from the scrubbing column 21 is withdrawn via conduit 23 at a temperature of about 45° C. and introduced, together with the main stream of absorbing agent from the scrubbing column 2, into the regenerating column 10.

The inert gases, now substantially free of $SO_2$ (residual content of about 6% $SO_2$), are withdrawn via conduit 24 from the head of the second scrubbing column 21, are expanded in 25 to 1 bar, and are returned into the scrubbing column 2, with the process being run in a continuous manner.

The preceding example can be repeated with similar success by substituting the generically or specifically described reactants and/or operating condition of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the separation of undesirable components from a gaseous mixture comprising undesirable components and inert gases, said undesirable components including $SO_2$ and said inert gases including $CO_2$, comprising (a) scrubbing said gaseous mixture in a first scrubbing column with a physical absorbing agent to absorb $SO_2$ and $CO_2$, (b) regenerating said absorbing agent in a regenerating column and recycling regenerated absorbing agent to the first scrubbing column, wherein $SO_2$ and $CO_2$ gases are released from the absorbing agent during regeneration, (c) delivering said $SO_2$ and $CO_2$ gases released during regeneration to an additional separation column wherein the $SO_2$ and $CO_2$ are separated into a first stream comprising $SO_2$ and a second stream comprising $SO_2$ and $CO_2$, said second stream being recycled to said first scrubbing column, wherein the improvement comprises removing $SO_2$ from said second stream in a second scrubbing column by contacting said second stream with a second physical absorbing agent, prior to recycling said second stream to said first scrubbing column.

2. A process according to claim 1 wherein said additional separation column is a distillation column.

3. A process according to claim 1, wherein the loaded second absorbing agent discharged from the second scrubbing column is regenerated in the same regenerating column as the loaded absorbing agent discharged from the first scrubbing column.

4. A process according to claim 1 wherein the loaded second absorbing agent discharged from the second scrubbing column is mixed with the loaded absorbing agent discharged from the first scrubbing column before being regenerated in the regenerating column.

5. A process according to claim 1 wherein the undesirable components are $SO_2$ and other sulfur containing gases.

6. A process according to claim 1 wherein the gaseous mixture is a flue gas stream.

7. A process according to claim 1 wherein the inert gases comprise $CO_2$, $N_2$ and $O_2$.

8. A process according to claim 1 wherein the undesirable components are removed via said first stream as a purified liquid $SO_2$ stream from said additional separation column.

9. A process according to claim 1 wherein about 50 to 99% of the undesirable components are separated from the inert gases in the second scrubbing column.

10. A process according to claim 1 wherein the physical absorbing agent is tetraethylene glycol dimethyl ether.

11. A process according to claim 1 wherein said second stream containing the undesirable components is fed to the second scrubbing column at a temperature of about 20° C. and a pressure of about 2 bar.

12. A process according to claim 1 wherein a partial stream of loaded absorbing agent is separated from the stream of loaded absorbing agent discharged from the first scrubbing column, said partial stream of loaded absorbing agent being delivered to said second scrubbing column as said second physical absorbing agent.

13. A process according to claim 12 wherein the partial stream of loaded absorbing agent comprises about 0.1–10% of the loaded absorbing agent discharged from the first scrubbing column.

14. A process according to claim 12 wherein the partial stream of loaded absorbing agent comprises about 1–3% of the loaded absorbing agent discharged from the first scrubbing column.

15. A process according to claim 12 wherein the physical absorbing agent is tetraethylene glycol dimethylether.

* * * * *